(12) United States Patent
Martinez Stone et al.

(10) Patent No.: US 12,538,341 B2
(45) Date of Patent: Jan. 27, 2026

(54) SYSTEMS AND METHODS FOR RESTRICTING RESOURCE ACCESS

(71) Applicant: Capital One Services, LLC, McLean, VA (US)

(72) Inventors: Armando Martinez Stone, McLean, VA (US); Samuel Rapowitz, Roswell, GA (US); Bryant Yee, Silver Spring, MD (US)

(73) Assignee: Capital One Services, LLC, McLean, VA (US)

(*) Notice: Subject to any disclaimer, the term of this patent is extended or adjusted under 35 U.S.C. 154(b) by 285 days.

(21) Appl. No.: 18/496,016

(22) Filed: Oct. 27, 2023

(65) Prior Publication Data

US 2025/0142608 A1    May 1, 2025

(51) Int. Cl.
*H04W 72/54* (2023.01)
*H04W 72/27* (2023.01)

(52) U.S. Cl.
CPC ........... *H04W 72/54* (2023.01); *H04W 72/27* (2023.01)

(58) Field of Classification Search
CPC .............................. H04W 72/54; H04W 72/27
USPC ......................................................... 370/329
See application file for complete search history.

(56) References Cited

U.S. PATENT DOCUMENTS

2019/0312730 A1* 10/2019 Engan ................... H04L 63/126
2022/0070002 A1*  3/2022 Turner .................. H04L 9/3247

* cited by examiner

*Primary Examiner* — Christopher R Crompton
(74) *Attorney, Agent, or Firm* — Foley & Lardner LLP

(57) ABSTRACT

Methods and systems for limiting resource access based on user input using an authentication token. In some aspects, the authentication token receives user input indicating a first allocation for a first resource access to be executed at a first time. The authentication token generates recommendations for a second allocation related to the first allocation. The user selects a second allocation. At the first time, the authentication token receives a first resource access request and executes the first allocation. The authentication token also transmits first metadata to an access approval system. At the second time, in response to a second resource access request, the authentication token or the access approval system compares the second resource access request to the first metadata or the second allocation to approve or decline the second resource access request.

20 Claims, 4 Drawing Sheets

SYSTEMS AND METHODS FOR RESTRICTING RESOURCE ACCESS

SUMMARY

Methods and systems are described herein for limiting resource access using an authentication token by receiving user input indicating an allocation for an expected resource access request. In some aspects, the authentication token may receive user input indicating a first allocation for a first resource access to be executed at a first time. The authentication token may generate recommendations for a second allocation related to the first allocation, and the user may select a second allocation. At the first time, the authentication token may receive a first resource access request and execute the first allocation. The authentication token may transmit first metadata to an access approval system. At the second time, in response to a second resource access request, the authentication token or the access approval system may compare the second resource access request to the first metadata or the second allocation to approve or decline the second resource access request.

Existing systems have not contemplated using an authentication token to record and enforce a limit on a second allocation prior to the second allocation. In particular, existing systems do not use an authentication token to record or suggest an upcoming resource allocation in association with a known resource allocation. The present systems and methods provide the user with control over resource allocations even when they are not present to oversee the execution themselves. The user has a convenient and secure mechanism for allowing upcoming resource access by using the authentication token and the methods described herein.

In some aspects, a method for limiting resource access based on user input is disclosed herein, the method comprising: receiving user input from a user comprising a first allocation associated with a first resource access to be executed at a first time; generating, based on the first allocation, a recommendation to the user for a second allocation related to the first resource access to be executed at a second time; using one or more physical components of an authentication token, receiving a user selection for the second allocation; based on the user selection, creating first metadata associated with the first resource access, the first metadata comprising the second allocation; at the first time, executing the first resource access and transmitting the first metadata to an access approval system; at the second time, receiving a request for the second allocation; determining whether the request exceeds the second allocation; and in response to determining that the request for the second resource access does not exceed the maximal threshold, granting the request for the second resource access.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
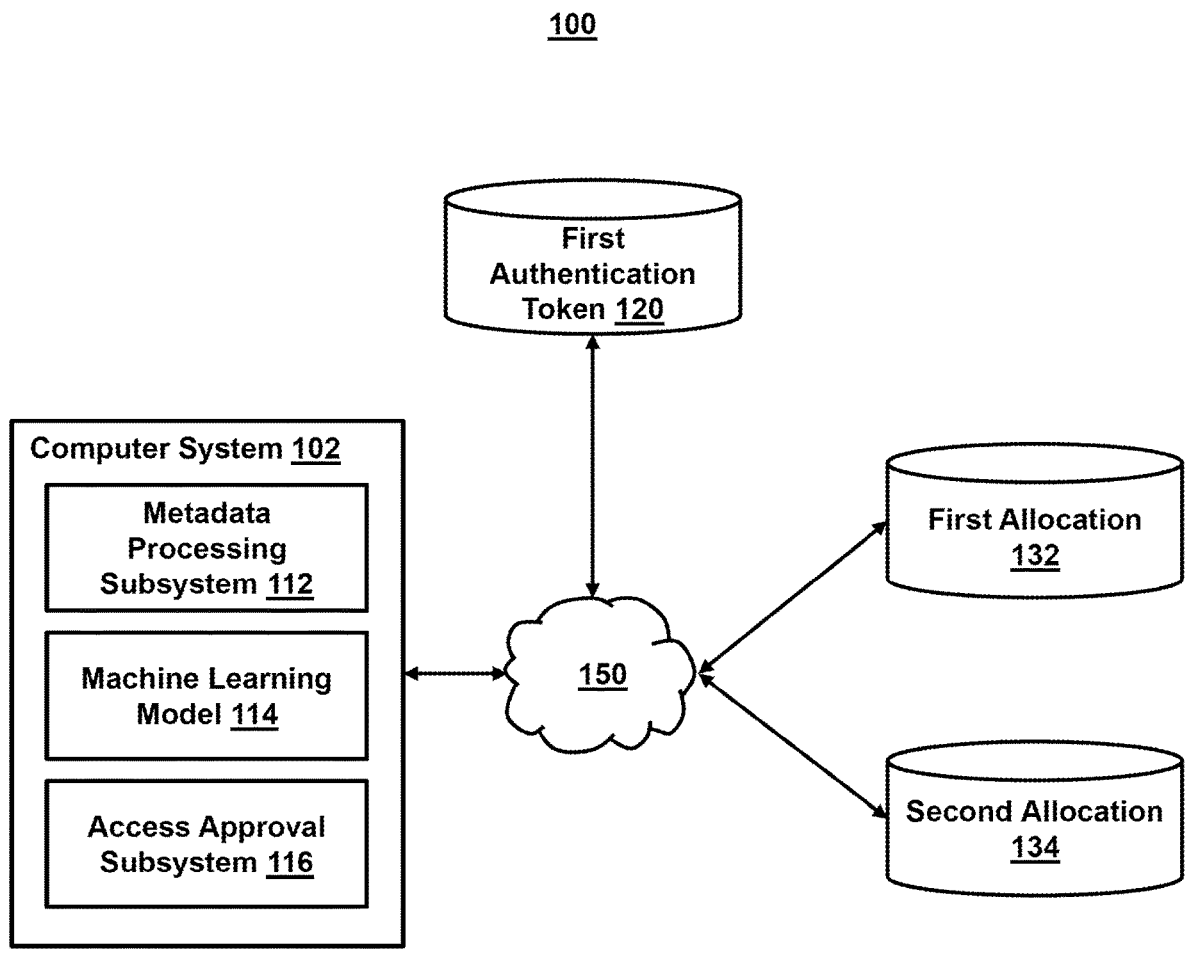
FIG. 1 shows an illustrative diagram for a system that limits resource access based on user input, in accordance with one or more embodiments.

FIG. 1 shows an illustrative diagram for system 100, which contains hardware and software components connected via network 150 and used for limiting resource access based on user input, in accordance with one or more embodiments. For example, Computer System 102, a part of system 100, may reside on a server of an access request processing system and include Metadata Processing Subsystem 112, Machine Learning Model 114, and Access Approval Subsystem 116. Additionally, system 100 may receive, store, and use First Allocation 132 and Second Allocation 134 in one or more contexts, for example from First Authentication Token 120.

The system (e.g., system 100) may be activated when an authentication token receives user input from a user including a first allocation (e.g., First Allocation 132) of a first resource access to be executed at a first time. The authentication token (e.g., First Authentication Token 120) may be configured to receive and store allocations of resource access, for example using one or more physical components on its exterior. First Authentication Token 120 may include one or more buttons indicating arithmetic operations usable by a user to input intended allocation extents for resource access. First Authentication Token 120 may include one or more processors configured to perform arithmetic operations which may process user input and generate metadata associated with allocations. The buttons and processors may also suggest recommendations to the user for allocation extents related to First Allocation 132. First Authentication Token 120 may receive resource access requests from resource access terminals and may in some embodiments approve or decline the resource access requests. In other embodiments, First Authentication Token 120 may instead transmit the received resource access request to an access approval subsystem (e.g., Access Approval Subsystem 116) along with metadata, where Access Approval Subsystem 116 may choose to approve or decline the resource access request. Below is an example embodiment where a user uses First Authentication Token 120 to specify limitations on a second allocation to follow a first allocation of resource access.

A user of First Authentication Token 120 may expect an upcoming resource access and wish to use First Authentication Token 120 to limit one or more allocations of the resource access. For example, the user may expect a first allocation of the resource access at a first time, and a second allocation at a second time subsequent to the first time. The user may expect a relationship between the first and second allocations. In some embodiments, the user may be able to direct the first allocation at the first time, but not the second allocation at the second time. For example, a first allocation may be an assignment of resources on a computer network to a first task. A second allocation may be an assignment of resources to a second task following the first task. In the example, the user may be able to monitor and control the progress of the first task, whereas the second task is by necessity automated and devoid of user control. For example, the second task may occur at a time unknown and unpredictable to the user. Alternatively or additionally, the second task may occur at a time when the user is unavailable to control the assignment of resources. However, the user may not wish to prescribe a fixed amount of resources assigned to the second task. Instead, the user may use First Authentication Token 120.

The user may, using physical components of First Authentication Token 120, input First Allocation 132. First Authentication Token 120 may store First Allocation 132 in its memory. First Allocation 132 may include quantitative and qualitative variables describing the first segment of the first resource access. For example, First Allocation 132 may describe a category of the resources assigned in the first segment and contain a real number describing a first amount of resources assigned in the first segment. The real number may in some embodiments symbolize a maximum amount that First Allocation 132 cannot exceed, and in other embodiments symbolize a precise amount to be used in First Allocation 132 exactly.

First Authentication Token 120 may, after receiving First Allocation 132, generate a recommendation to the user regarding a second allocation (e.g., Second Allocation 134) of the resource access. Second Allocation 134 may be related to First Allocation 132 despite occurring at a time subsequent to First Allocation 132. For example, Second Allocation 134 may be required to be of the same category as First Allocation 132. Additionally or alternatively, the extent of Second Allocation 134 may be limited to a proportion of First Allocation 132. For example, the user may wish that Second Allocation 134, which occurs at an unknown time after First Allocation 132, be no more than one third the extent of the First Allocation 132.

First Authentication Token 120 may generate the recommendation for Second Allocation 134 based on First Allocation 132 received from the user. For example, First Authentication Token 120 may apply a predetermined mathematical formula to the extent of First Allocation 132 to determine an extent of Second Allocation 134. First Authentication Token 120 may first determine to use a preset percentage of the extent of First Allocation 132 and use processors to calculate a real number corresponding to the percentage. First Authentication Token 120 may then compare the real number against a preset threshold number, and use the lesser of the two to suggest a maximum extent for Second Allocation 134. In some embodiments, First Authentication Token 120 may store in its memory past resource allocations. Among such past resource allocations may be related allocations where a second allocation is ancillary to a first allocation. First Authentication Token 120 may use past related allocations to determine an average relation, for example a percentage of the extent of the second allocation in comparison to the first allocation. The percentage may be an average of percentages of second allocation extents to first allocation extents. First Authentication Token 120 may weigh each percentage according to recency to generate a weighted average percentage. First Authentication Token 120 may generate multiple recommended extents for Second Allocation 134, for example by using different preset percentages. First Authentication Token may also generate a recommendation based on a preset percentage and another recommendation based on past average percentages. First Authentication Token 120 may present its one or more recommendations to the user using displays on its exterior.

In some embodiments, First Authentication Token 120 may use a machine learning model to generate recommendations for Second Allocation 134. The machine learning model may use as input First Allocation 132 and/or a record of past allocations. Features for the machine learning model may include a category, location, time, and extent of First Allocation 132, extents and categories for past allocations, and mathematical relations between related allocations among the past allocations. The machine learning model may use algorithms like linear regression or neural networks to produce an output signifying an extent for Second Allocation 134.

In response to First Authentication Token 120 presenting its recommendations on a display, the user may use one or more physical components of First Authentication Token 120 to select a recommendation to form the parameters of Second Allocation 134. For example, First Authentication Token 120 may be a card with one or more buttons on its exterior, the buttons being connected to processors on the interior of First Authentication Token 120 and being designed to indicate user input such as selections from among the recommendations for Second Allocation 134. In some embodiments, the user may, instead of selecting a recommendation by First Authentication Token 120 for Second Allocation 134, choose to use physical components of First Authentication Token 120 to input alternate parameters for Second Allocation 134. In either case, in response to user input, First Authentication Token 120 may create first metadata associated with the first resource access, the first metadata describing the second allocation. The first metadata may be stored in the memory of First Authentication Token 120.

At the first time, First Authentication Token 120 may receive a request for resource access including a requested allocation. First Authentication Token 120 may compare the requested allocation with First Allocation 132 to determine that the category and extent of the requested allocation fall within the parameter of First Allocation 132. If the requested allocation satisfies First Allocation 132, First Authentication Token 120 may execute the first allocation of the first resource access. Concurrently, First Authentication Token 120 may transmit the first metadata to a metadata processing system (e.g., Metadata Processing Subsystem 112) and/or an access approval system (e.g., Access Approval Subsystem 116). First Authentication Token 120 may do so using Near Field Communication or using a Radio-Frequency ID tag in communication with a resource access terminal. The resource access terminal may then further transmit the first metadata to Metadata Processing Subsystem 112, where it may be stored in memory. Metadata Processing Subsystem 112 may perform a data cleansing process on the first metadata, including standardizing its formatting, units of measurement, pruning null entries, and reducing irregularities. In some embodiments, Metadata Processing Subsystem 112 may include or communicate with a machine learning model (e.g., Machine Learning Model 114). Metadata Processing Subsystem 112 may transmit the first metadata and/or the output of Machine Learning Model 114 to Access Approval Subsystem 116, which may reside on a server or a node in a payment network. In some embodiments, Access Approval Subsystem 116 may determine whether to approve or decline the first or second allocations of the resource access request. For example, Access Approval Subsystem 116 may compare the category and extent of First Allocation 132 against past resource allocation requests associated with the user account to determine whether to approve First Allocation 132. Access Approval Subsystem 116 may use Machine Learning Model 114 to process First Allocation 132 and past allocations of the user account and generate a binary or real-valued output signifying whether to approve First Allocation 132, for example by using the logistic regression algorithm. Machine Learning Model 114 may be trained to produce an output classification indicating whether a resource access request should be approved. Machine Learning Model 114 may be trained on past resource access requests, including labeled data indicating the appropriate outcome in each case. Machine Learning Model 114 may use input data in a format including parameters of the allocation under consideration for approval, a history of resource access requests associated with the user account, and the approval status of resource access requests associated with the user account. Machine Learning Model 114 may be trained using, for example, the gradient descent technique, with a loss metric of incorrect classifications of resource allocation requests. In some embodiments, Machine Learning Model 114 may instead output a degree of confidence that a resource access request should be approved, the degree of confidence being a real number between 0 and 1. The loss outcome in such embodiments may be the absolute value of a mathematical difference between the output of Machine Learning Model 114 and the appropriate outcome.

In other embodiments, First Authentication Token 120 may compare the requested allocation against First Allocation 132 and determine whether to approve the requested allocation. First Authentication Token 120 may, upon receiving user input indicating approval of the requested allocation, execute First Allocation 132 to completion. In either case, First Authentication Token 132 will transmit the first metadata to Access Approval Subsystem 116, where it may be stored in memory in anticipation of a second allocation (e.g., Second Allocation 134) at a second time.

At a second time, which may follow the first time by an unpredictable or unknown length of time, First Authentication Token 120 may receive a request for Second Allocation 134. For example, the second requested allocation may be from the same resource access terminal as the terminal which requested First Allocation 132. At the second time, the user being unable to provide input indicating approval of the second requested allocation, First Authentication Token 120 may coordinate with Access Approval Subsystem 116 to determine whether to approve the second requested allocation. For example, First Authentication Token 120 may compare the second requested allocation with the first metadata to determine if the category and extent of the second requested allocation fall within the parameters of Second Allocation 134. As a consequence, First Authentication Token 120 may deny the second requested allocation. Alternatively or additionally, First Authentication Token 120 may transmit a request to Access Approval Subsystem 116 to review the request for the second resource access. Access Approval Subsystem 116 may use Machine Learning Model 114 to make a more informed decision. First Authentication Token 120 may also transmit a notification to the user indicating that the request for the second resource access exceeds the second allocation in this example. In some embodiments, First Authentication Token 120 may use the first metadata to determine a threshold number symbolizing a maximal extent for the second requested allocation. If the second requested allocation falls under the threshold number, First Authentication Token 120 may approve the request; otherwise, it may reject the request. The threshold number may be generated by Machine Learning Model 114 in some embodiments, and Access Approval Subsystem 116 may determine whether to approve the second requested allocation. In some embodiments, after First Authentication Token 120 or Access Approval Subsystem 116 approved Second Allocation 134 for the resource access at the second time, the user may dispute the second allocation. The user may, for example, submit a disputed amount where the disputed amount is what the user intended to have allowed for Second Allocation 134. Access Approval Subsystem 116 may determine whether the disputed amount is legitimate, for example using Machine Learning Model 114. In response to determining that the disputed amount is appropriate for Second Allocation 134, Access Approval Subsystem 116 may revoke the approval for the second requested allocation.

In some embodiments, the user may transmit a first allocation (e.g., First Allocation 132) and an intended second allocation (e.g., Second Allocation 134) to a mobile application on a mobile device instead of a physical component like First Authentication Token 120. For example, the user may execute First Allocation 132 using First Authentication Token 120 or some other means. An access approval system (e.g., Access Approval Subsystem 116) may be notified of the successful execution of First Allocation 132, and communicate with the mobile application such that the mobile device stores, and may display through the mobile application, First Allocation 132. In some embodiments, the user may transmit First Allocation 132 to the mobile application prior to it being executed. In such embodiments, the mobile application may communicate with Access Approval Subsystem 116 to verify the correct execution of First Allocation 132 at the first time.

The mobile application may display a category and extent of First Allocation 132 upon receiving it. In some embodiments, the mobile application may generate recommendations regarding a possible second allocation. The recommendations may be generated using a predetermined mathematical transformation, calculated to be an average proportion of First Allocation 132 based on past allocations, or generated by a machine learning model. The recommendations may be displayed on the user device, including categories and extents, and the mobile application may prompt the user to input a selection among the recommendations. In response to a user selection, the mobile application may create first metadata associated with First Allocation 132 and stored in the memory of the mobile device. The first metadata describes Second Allocation 134, which may occur at a second time. At the second time, Access Approval Subsystem 116 may communicate with the mobile application to verify the second request, which was transmitted from an access requesting terminal, against Second Allocation 134. The mobile application may indicate whether to approve or deny the second request by comparing the extent and category of the second request against Second Allocation 134.

Figure 2:
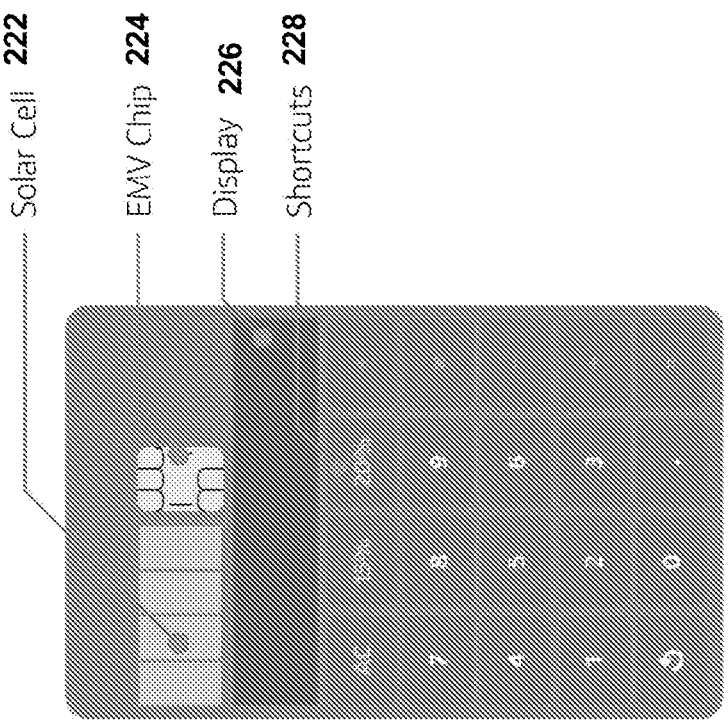
FIG. 2 shows an illustration of designs for authentication tokens that limit resource access, in accordance with one or more embodiments.
Figure 2:
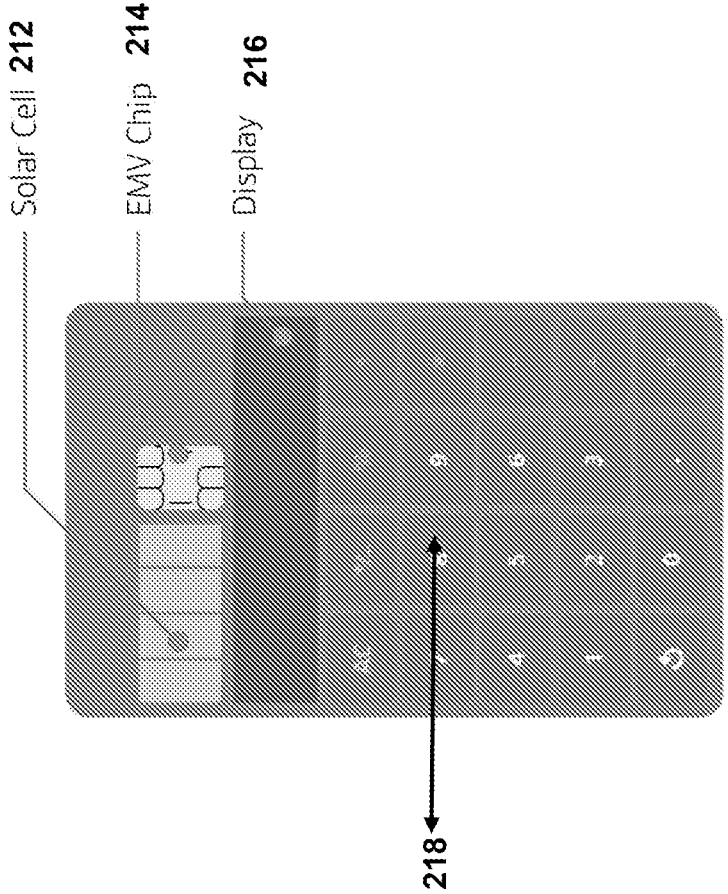

FIG. 2 shows example layouts of authentication tokens of the same type as First Authentication Token 120. Design 210 shows an authentication token including a physical device containing various components that enable various functionalities. Design 210 may be, for example, a payment instrument such as a credit card. Design 210 may be able to approve or deny transactions, for example using EMV Chip 214. EMV Chip 214 may also transmit metadata such as the first metadata to an access approval system, through Near-Field Communication. EMV Chip 214 may also indicate to the access approval system whether a request for resource access should be approved. Design 210 may contain non-transitory computer-readable media, which may be powered using Solar Cell 212. The non-transitory computer-readable media may be able to perform arithmetic operations and/or store data in memory. For example, the non-transitory computer-readable media may receive an extent of a first allocation and perform predetermined mathematical operations to the first allocation to determine recommendations for a second allocation. The non-transitory computer-readable media may display its recommendations on Display 216 to the user. The user may use Input Component 218 to select one of the displayed recommendations. The user may also use Input Component 218 to indicate an alternate set of parameters for the second allocation. For example, Input Component 218 includes various buttons indicating arithmetic operations. The user may use the buttons to halve the recommendation on Display 216 and use a different button to confirm their selection. The non-transitory computer-readable media may store the user selection as the first metadata in its memory. At the first time, while executing the first allocation, the system may use EMV Chip 214 to, for example, transmit the first metadata to an access approval system. At the second time, Design 210 may retrieve the second allocation from memory and compare it against the second request. After determining whether to approve the second request, Design 210 may use EMV Chip 214 to execute its determination for the second request.

Design 212 may be an authentication token designed to perform the same operations as Design 210. Design 212 may contain the same non-transitory computer-readable media as described above, albeit with different physical components. The non-transitory computer-readable media may be powered by Solar Cell 222, and its recommendations may be displayed on Display 226. EMV Chip 224 may be used to approve and deny resource access requests and/or transmit data to an access approval system. Shortcuts 228 is distinct from Input Component 218, for example, by including shortcuts symbolizing predetermined shortcuts in addition to arithmetic operations. The shortcuts may allow the user to execute an established mathematical transformation to a first allocation expediently.

Figure 3:
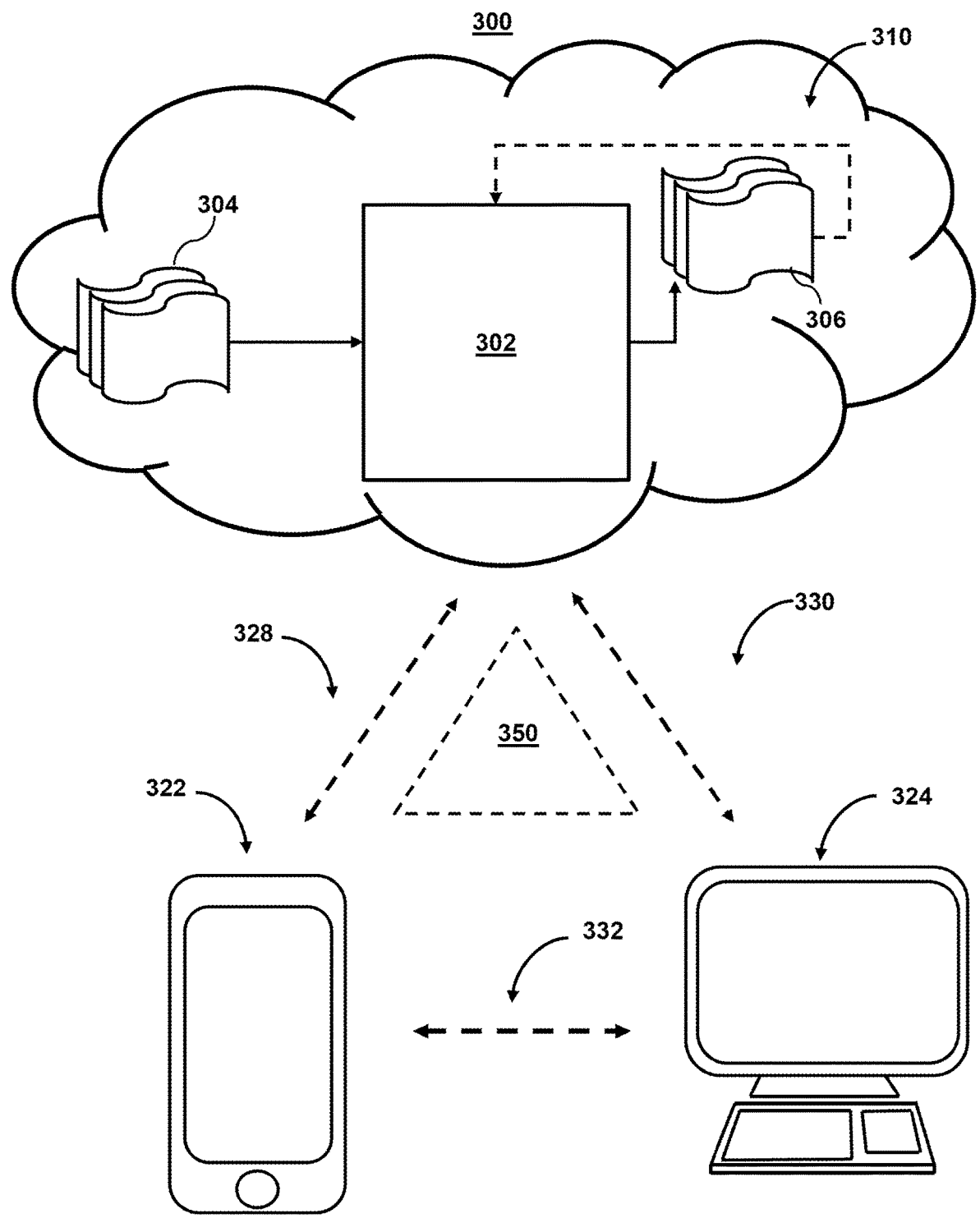
FIG. 3 shows illustrative components for a system for limiting resource access based on user input, in accordance with one or more embodiments.

FIG. 3 shows illustrative components for a system used to communicate between the system and user devices and collect data, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., predicting resource allocation values for user systems).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., predicting resource allocation values for user systems).

In some embodiments, the model (e.g., model 302) may automatically perform actions based on outputs 306. In some embodiments, the model (e.g., model 302) may not perform any actions. The output of the model (e.g., model 302) may be used to predict resource allocation values for user systems).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDoS protection, and API layer 350 may use RESTful APIs as standard for external integration.

Figure 4:
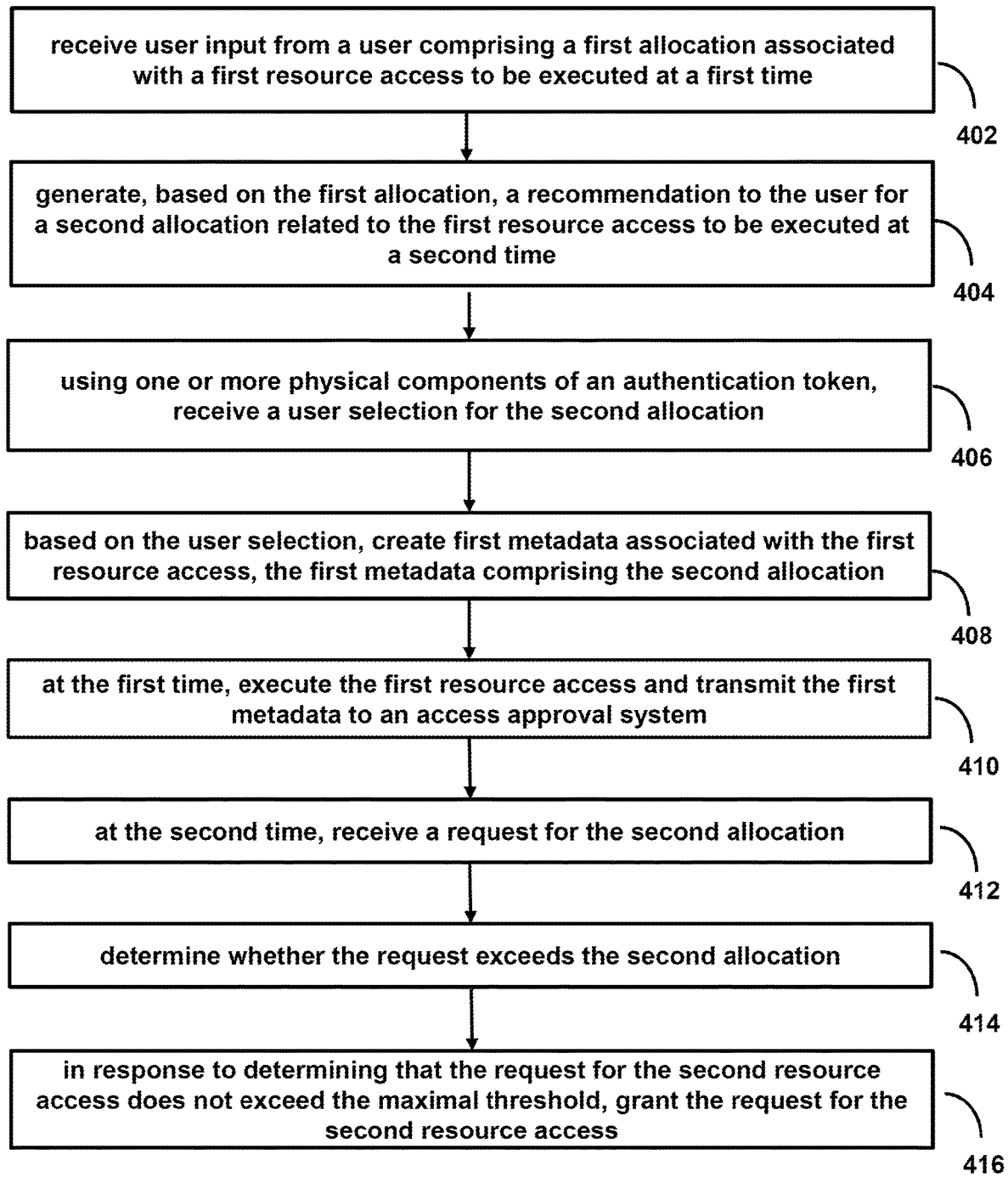
FIG. 4 shows a flowchart of the steps involved in limiting resource access based on user input, in accordance with one or more embodiments.

FIG. 4 shows a flowchart of the steps involved in limiting resource access based on user input, in accordance with one or more embodiments. For example, the system may use process 400 (e.g., as implemented on one or more system components described above) in order to limit resource access based on user input by associated a first allocation with a second allocation and using metadata to control the extent of the second allocation.

At step 402, process 400 (e.g., using one or more components described above) the system receives user input from a user comprising a first allocation associated with a first resource access to be executed at a first time. A user of First Authentication Token 120 may expect an upcoming resource access and wish to use First Authentication Token 120 to limit one or more allocations of the resource access. For example, the user may expect a first allocation of the resource access at a first time, and a second allocation at a second time subsequent to the first time. The user may expect a relationship between the first and second allocations. In some embodiments, the user may be able to direct the first allocation at the first time, but not the second allocation at the second time. For example, a first allocation may be an assignment of resources on a computer network to a first task. A second allocation may be an assignment of resources to a second task following the first task. In the example, the user may be able to monitor and control the progress of the first task, whereas the second task is by necessity automated and devoid of user control. For example, the second task may occur at a time unknown and unpredictable to the user. Alternatively or additionally, the second task may occur at a time when the user is unavailable to control the assignment of resources. However, the user may not wish to prescribe a fixed amount of resources assigned to the second task. Instead, the user may use First Authentication Token 120.

The user may, using physical components of First Authentication Token 120, input First Allocation 132. First Authentication Token 120 may store First Allocation 132 in its memory. First Allocation 132 may include quantitative and qualitative variables describing the first segment of the first resource access. For example, First Allocation 132 may describe a category of the resources assigned in the first segment and contain a real number describing a first amount of resources assigned in the first segment. The real number may in some embodiments symbolize a maximum amount that First Allocation 132 cannot exceed, and in other embodiments symbolize a precise amount to be used in First Allocation 132 exactly.

At step 404, process 400 (e.g., using one or more components described above) the system generates, based on the first allocation, a recommendation to the user for a second allocation related to the first resource access to be executed at a second time. First Authentication Token 120 may, after receiving First Allocation 132, generate a recommendation to the user regarding a second allocation (e.g., Second Allocation 134) of the resource access. Second Allocation 134 may be related to First Allocation 132 despite occurring at a time subsequent to First Allocation 132. For example, Second Allocation 134 may be required to be of the same category as First Allocation 132. Additionally or alternatively, the extent of Second Allocation 134 may be limited to a proportion of First Allocation 132. For example, the user may wish that Second Allocation 134, which occurs at an unknown time after First Allocation 132, be no more than one third the extent of the First Allocation 132.

First Authentication Token 120 may generate the recommendation for Second Allocation 134 based on First Allocation 132 received from the user. For example, First Authentication Token 120 may apply a predetermined mathematical formula to the extent of First Allocation 132 to determine an extent for Second Allocation 134. First Authentication Token 120 may first determine to use a preset percentage of the extent of First Allocation 132 and use processors to calculate a real number corresponding to the percentage. First Authentication Token 120 may then compare the real number against a preset threshold number and use the lesser of the two to suggest a maximum extent for Second Allocation 134. In some embodiments, First Authentication Token 120 may store in its memory past resource allocations. Among such past resource allocations may be related allocations where a second allocation is ancillary to a first allocation. First Authentication Token 120 may use past related allocations to determine an average relation, for example a percentage of the extent of the second allocation in comparison to the first allocation. The percentage may be an average of percentages of second allocation extents to first allocation extents. First Authentication Token 120 may weigh each percentage according to recency to generate a weighted average percentage. First Authentication Token 120 may generate multiple recommended extents for Second Allocation 134, for example by using different preset percentages. First Authentication Token may also generate a recommendation based on a preset percentage and another recommendation based on past average percentages. First Authentication Token 120 may present its one or more recommendations to the user using displays on its exterior.

In some embodiments, First Authentication Token 120 may use a machine learning model to generate recommendations for Second Allocation 134. The machine learning model may use as input First Allocation 132 and/or a record of past allocations. Features for the machine learning model may include a category, location, time, and extent of First Allocation 132, extents and categories for past allocations, and mathematical relations between related allocations among the past allocations. The machine learning model may use algorithms like linear regression or neural networks to produce an output signifying an extent for Second Allocation 134.

At step 406, process 400 (e.g., using one or more components described above) the system, using one or more physical components of an authentication token, receives a user selection for the second allocation. In response to First Authentication Token 120 presenting its recommendations on a display, the user may use one or more physical components of First Authentication Token 120 to select a recommendation to form the parameters of Second Allocation 134. For example, First Authentication Token 120 may be a card with one or more buttons on its exterior, the buttons being connected to processors on the interior of First Authentication Token 120 and being designed to indicate user input such as selections from among the recommendations for Second Allocation 134. In some embodiments, the user may, instead of selecting a recommendation by First Authentication Token 120 for Second Allocation 134, choose to use physical components of First Authentication Token 120 to input alternate parameters for Second Allocation 134. In either case, in response to user input, First Authentication Token 120 may create first metadata associated with the first resource access, the first metadata describing the second allocation. The first metadata may be stored in the memory of First Authentication Token 120.

At step 408, process 400 (e.g., using one or more components described above) the system, based on the user selection, creates first metadata associated with the first resource access, the first metadata comprising the second allocation. The first metadata may, for example, specify the category and extent of the expected second allocation. The first metadata may include quantitative and qualitative variables describing the second resource allocation as expected. For example, the first metadata may describe a category of the resources reserved for the second resource allocation, and contain a real number describing a first amount of resources assigned to the second allocation. The real number may in some embodiments symbolize a maximum amount that the second allocation will not be allowed to exceed, and in other embodiments symbolize a precise amount to be used in the second allocation exactly.

At step 410, process 400 (e.g., using one or more components described above) the system executes the first resource access and transmits the first metadata to an access approval system at the first time. At the first time, First Authentication Token 120 may receive a request for resource access including a requested allocation. First Authentication Token 120 may compare the requested allocation with First Allocation 132 to determine that the category and extent of the requested allocation falls within the parameter of First Allocation 132. If the requested allocation satisfies First Allocation 132, First Authentication Token 120 may execute the first allocation of the first resource access. Concurrently, First Authentication Token 120 may transmit the first metadata to a metadata processing system (e.g., Metadata Processing Subsystem 112) and/or an access approval system (e.g., Access Approval Subsystem 116). First Authentication Token 120 may do so using Near Field Communication or using a Radio-Frequency ID tag in communication with a resource access terminal. The resource access terminal may then further transmit the first metadata to Metadata Processing Subsystem 112, where it may be stored in memory. Metadata Processing Subsystem 112 may perform a data cleansing process on the first metadata, including standardizing its formatting, units of measurement, pruning null entries, and reducing irregularities. In some embodiments, Metadata Processing Subsystem 112 may include or communicate with a machine learning model (e.g., Machine Learning Model 114). Metadata Processing Subsystem 112 may transmit the first metadata and/or the output of Machine Learning Model 114 to Access Approval Subsystem 116, which may reside on a server or a node in a payment network. In some embodiments, Access Approval Subsystem 116 may determine whether to approve or decline the first or second allocations of the resource access request. For example, Access Approval Subsystem 116 may compare the category and extent of First Allocation 132 against past resource allocation requests associated with the user account to determine whether to approve First Allocation 132. Access Approval Subsystem 116 may use Machine Learning Model 114 to process First Allocation 132 and past allocations of the user account and generate a binary or real-valued output signifying whether to approve First Allocation 132, for example by using the logistic regression algorithm. Machine Learning Model 114 may be trained to produce an output classification indicating whether a resource access request should be approved. Machine Learning Model 114 may be trained on past resource access requests, including labeled data indicating the appropriate outcome in each case. Machine Learning Model 114 may use input data in a format including parameters of the allocation under consideration for approval, a history of resource access requests associated with the user account, and the approval status of resource access requests associated with the user account. Machine Learning Model 114 may be trained using, for example, the gradient descent technique, with a loss metric of incorrect classifications of resource allocation requests. In some embodiments, Machine Learning Model 114 may instead output a degree of confidence that a resource access request should be approved, the degree of confidence being a real number between 0 and 1. The loss outcome in such embodiments may be the absolute value of a mathematical difference between the output of Machine Learning Model 114 and the appropriate outcome.

In other embodiments, First Authentication Token 120 may compare the requested allocation against First Allocation 132 and determine whether to approve the requested allocation. First Authentication Token 120 may, upon receiving user input indicating approval of the requested allocation, execute First Allocation 132 to completion. In either case, First Authentication Token 132 will transmit the first metadata to Access Approval Subsystem 116, where it may be stored in memory in anticipation of a second allocation (e.g., Second Allocation 134) at a second time.

At step 412, process 400 (e.g., using one or more components described above) the system receives a request for the second allocation at the second time. At step 414, process 400 (e.g., using one or more components described above) the system determines whether the request exceeds the second allocation. At step 416, process 400 (e.g., using one or more components described above) the system, in response to determining that the request for the second resource access does not exceed the maximal threshold, grants the request for the second resource access. At a second time, which may follow the first time by an unpredictable or unknown length of time, First Authentication Token 120 may receive a request for Second Allocation 134. For example, the second requested allocation may be from the same resource access terminal as requested First Allocation 132. At the second time, the user being unable to provide input indicating approval of the second requested allocation, First Authentication Token 120 may coordinate with Access Approval Subsystem 116 to determine whether to approve the second requested allocation. For example, First Authentication Token 120 may compare the second requested allocation with the first metadata to determine if the category and extent of the second requested allocation fall within the parameters of Second Allocation 134. As a consequence, First Authentication Token 120 may deny the second requested allocation. Alternatively or additionally, First Authentication Token 120 may transmit a request to Access Approval Subsystem 116 to review the request for the second resource access. Access Approval Subsystem 116 may use Machine Learning Model 114 to make a more informed decision. First Authentication Token 120 may also transmit a notification to the user indicating that the request for the second resource access exceeds the second allocation in this example. In some embodiments, First Authentication Token 120 may use the first metadata to determine a threshold number symbolizing a maximal extent for the second requested allocation. If the second requested allocation falls under the threshold number, First Authentication Token 120 may approve the request; otherwise, it may reject the request. The threshold number may be generated by Machine Learning Model 114 in some embodiments, and Access Approval Subsystem 116 may determine whether to approve the second requested allocation. In some embodiments, after First Authentication Token 120 or Access Approval Subsystem 116 approved Second Allocation 134 for the resource access at the second time, the user may dispute the second allocation. The user may, for example, submit a disputed amount where the disputed amount is what the user intended to have allowed for Second Allocation 134. Access Approval Subsystem 116 may determine whether the disputed amount is legitimate, for example using Machine Learning Model 114. In response to determining that the disputed amount is appropriate for Second Allocation 134, Access Approval Subsystem 116 may revoke the approval for the second requested allocation.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving user input from a user comprising a first allocation associated with a first resource access to be executed at a first time; generating, based on the first allocation, a recommendation to the user for a second allocation related to the first resource access to be executed at a second time; using the one or more buttons, receiving a user selection for the second allocation; based on the user selection, creating first metadata associated with the first resource access, the first metadata comprising the second allocation; at the first time, executing the first allocation of the first resource access in response to a first request and transmitting the first metadata to an access approval system; at the second time, receiving a second request for the second allocation; determining whether the second request exceeds the second allocation; in response to determining that the second request does not exceed the second allocation, granting the second request; and in response to determining that the second request exceeds the second allocation, rejecting the second request.
2. A method comprising: receiving user input from a user comprising a first allocation associated with a first resource access to be executed at a first time, wherein the user is associated with a user account to which the first resource access is directed; generating, based on the first allocation, a recommendation to the user for a second allocation related to the first resource access to be executed at a second time; using one or more physical components of an authentication token, receiving a user selection for the second allocation; based on the user selection, creating first metadata associated with the first resource access, the first metadata comprising the second allocation; at the first time, executing the first resource access and transmitting the first metadata to an access approval system; at the second time, receiving a second request for the second allocation; determining whether the second request exceeds the second allocation; and in response to determining that the second request does not exceed the second allocation, granting the second request.
3. A method comprising: at a first time, executing a first allocation of a first resource access for a user account of a user; suggesting to the user a second allocation to be executed at a second time, wherein the second allocation is related to the first resource access; using one or more physical components of an authentication token, receiving a user selection for the second allocation; based on the user selection, transmitting first metadata to an access approval system, the first metadata comprising the second allocation; at the second time, receiving a second request for the second allocation; and in response to determining that the second request exceeds the second allocation, declining the second request.
4. The method of any one of the preceding embodiments, further comprising: determining that the second request exceeds the second allocation; rejecting the second request at a resource access terminal.
5. The method of any one of the preceding embodiments, further comprising: determining that the second request exceeds the second allocation; transmitting a request to the access approval system to review the second request; and transmitting a notification to the user indicating that the second request exceeds the second allocation.
6. The method of any one of the preceding embodiments, wherein determining whether the second request satisfies the second allocation comprises: using the second allocation and the first allocation, determining a threshold number; comparing the threshold number against a second access extent associated with the second request; in response to determining that the second access extent is less than the threshold number, determining that the second request satisfies the second allocation; and in response to determining that the second access extent exceeds the threshold number, determining that the second request exceeds the second allocation.
7. The method of any one of the preceding embodiments, wherein determining whether the second request satisfies the second allocation comprises: using a machine learning model to process the first metadata for the user account and generate a threshold number; comparing the threshold number against a second access extent associated with the second request; in response to determining that the second access extent is less than the threshold number, determining that the second request satisfies the second allocation; and in response to determining that the second access extent exceeds the threshold number, determining that the second request exceeds the second allocation.
8. The method of any one of the preceding embodiments, wherein determining whether the second request satisfies the second allocation further comprises: receiving a dispute notification from the user associated with the second allocation, comprising a disputed access extent; and using the disputed access extent, determining that the second request exceeds the second allocation.

9. The method of any one of the preceding embodiments, wherein transmitting the first metadata to the access approval system comprises: establishing a line of communication to a resource access network node using near-field communication; using the line of communication, transmitting the first metadata to the access approval system.

10. The method of any one of the preceding embodiments, wherein transmitting the first metadata to the access approval system comprises: establishing a line of communication to a resource access network node using a mobile application on a user device associated with the user account; using the line of communication, transmitting the first metadata to the access approval system.

11. The method of any one of the preceding embodiments, wherein the recommendation for the second allocation is a lesser of a percentage of the first allocation and a fixed amount.

12. The method of any one of the preceding embodiments, wherein the first metadata further comprises a recent access history associated with the user account comprising locations, extents, and respective approval status of recent resource access requests.

13. One or more non-transitory computer-readable media storing instructions that, when executed by a data processing apparatus, cause the data processing apparatus to perform operations comprising those of any of embodiments 1-12.

14. A system comprising one or more processors; and one or more non-transitory computer-readable media storing instructions that, when executed by the one or more processors, cause the one or more processors to effectuate operations comprising those of any of embodiments 1-12.

15. A system comprising means for performing any of embodiments 1-12.

What is claimed is:

1. An authentication token for limiting resource access based on user input, comprising:
one or more buttons indicating arithmetic operations;
one or more processors configured to performing arithmetic operations;
one or more memories to store resource allocations;
one or more computer-readable media performing operations comprising:
receiving user input from a user comprising a first allocation associated with a first resource access to be executed at a first time;
generating, based on the first allocation, a recommendation to the user for a second allocation related to the first resource access to be executed at a second time;
using the one or more buttons, receiving a user selection for the second allocation;
based on the user selection, creating first metadata associated with the first resource access, the first metadata comprising the second allocation;
at the first time, executing the first allocation of the first resource access in response to a first request and transmitting the first metadata to an access approval system;
at the second time, receiving a second request for the second allocation;
determining whether the second request exceeds the second allocation;
in response to determining that the second request does not exceed the second allocation, granting the second request; and
in response to determining that the second request exceeds the second allocation, rejecting the second request.

2. A method for limiting resource access based on user input, comprising:
receiving user input from a user comprising a first allocation associated with a first resource access to be executed at a first time, wherein the user is associated with a user account to which the first resource access is directed;
generating, based on the first allocation, a recommendation to the user for a second allocation related to the first resource access to be executed at a second time;
using one or more physical components of an authentication token, receiving a user selection for the second allocation;
based on the user selection, creating first metadata associated with the first resource access, the first metadata comprising the second allocation;
at the first time, executing the first resource access and transmitting the first metadata to an access approval system;
at the second time, receiving a second request for the second allocation;
determining whether the second request exceeds the second allocation; and
in response to determining that the second request does not exceed the second allocation, granting the second request.

3. The method of claim 2, wherein the first metadata further comprises a recent access history associated with the user account comprising locations, extents, and respective approval status of recent resource access requests.

4. The method of claim 2, further comprising:
determining that the second request exceeds the second allocation;
rejecting the second request at a resource access terminal.

5. The method of claim 2, further comprising:
determining that the second request exceeds the second allocation;
transmitting a request to the access approval system to review the second request; and
transmitting a notification to the user indicating that the second request exceeds the second allocation.

6. The method of claim 2, wherein determining whether the second request satisfies the second allocation comprises:
using the second allocation and the first allocation, determining a threshold number;
comparing the threshold number against a second access extent associated with the second request;
in response to determining that the second access extent is less than the threshold number, determining that the second request satisfies the second allocation; and
in response to determining that the second access extent exceeds the threshold number, determining that the second request exceeds the second allocation.

7. The method of claim 3, wherein determining whether the second request satisfies the second allocation comprises:

using a machine learning model to process the first metadata for the user account and generate a threshold number;

comparing the threshold number against a second access extent associated with the second request;

in response to determining that the second access extent is less than the threshold number, determining that the second request satisfies the second allocation; and in response to determining that the second access extent exceeds the threshold number, determining that the second request exceeds the second allocation.

8. The method of claim 2, wherein determining whether the second request satisfies the second allocation further comprises:

receiving a dispute notification from the user associated with the second allocation, comprising a disputed access extent; and using the disputed access extent, determining that the second request exceeds the second allocation.

9. The method of claim 2, wherein transmitting the first metadata to the access approval system comprises:

establishing a line of communication to a resource access network node using near-field communication;

using the line of communication, transmitting the first metadata to the access approval system.

10. The method of claim 2, wherein transmitting the first metadata to the access approval system comprises:

establishing a line of communication to a resource access network node using a mobile application on a user device associated with the user account;

using the line of communication, transmitting the first metadata to the access approval system.

11. The method of claim 2, wherein the recommendation for the second allocation is a lesser of a percentage of the first allocation and a fixed amount.

12. One or more non-transitory, computer-readable media comprising instructions that, when executed by one or more processors, cause operations comprising:

at a first time, executing a first allocation of a first resource access for a user account of a user;

suggesting to the user a second allocation to be executed at a second time, wherein the second allocation is related to the first resource access;

using one or more physical components of an authentication token, receiving a user selection for the second allocation;

based on the user selection, transmitting first metadata to an access approval system, the first metadata comprising the second allocation;

at the second time, receiving a second request for the second allocation; and in response to determining that the second request exceeds the second allocation, declining the second request.

13. The one or more non-transitory, computer-readable media of claim 12, wherein the first metadata further comprises a recent access history associated with the user account comprising locations, extents, and respective approval status of recent resource access requests.

14. The one or more non-transitory, computer-readable media of claim 12, further comprising:

determining that the second request exceeds the second allocation; and rejecting the second request at a resource access terminal.

15. The one or more non-transitory, computer-readable media of claim 12, further comprising:

determining that the second request exceeds the second allocation;

transmitting a request to the access approval system to review the second request; and transmitting a notification to the user indicating that the second request exceeds the second allocation.

16. The one or more non-transitory, computer-readable media of claim 12, wherein determining whether the second request satisfies the second allocation comprises:

using the second allocation and the first allocation, determining a threshold number;

comparing the threshold number against a second access extent associated with the second request;

in response to determining that the second access extent is less than the threshold number, determining that the second request satisfies the second allocation; and in response to determining that the second access extent exceeds the threshold number, determining that the second request exceeds the second allocation.

17. The one or more non-transitory, computer-readable media of claim 12, wherein determining whether the second request satisfies the second allocation comprises:

using a machine learning model to process the first metadata for the user account and generate a threshold number;

comparing the threshold number against a second access extent associated with the second request;

in response to determining that the second access extent is less than the threshold number, determining that the second request satisfies the second allocation; and in response to determining that the second access extent exceeds the threshold number, determining that the second request exceeds the second allocation.

18. The one or more non-transitory, computer-readable media of claim 12, wherein determining whether the second request satisfies the second allocation further comprises:

receiving a dispute notification from the user associated with the second allocation, comprising a disputed access extent; and using the disputed access extent, determining that the second request exceeds the second allocation.

19. The one or more non-transitory, computer-readable media of claim 12, wherein transmitting the first metadata to the access approval system comprises:

establishing a line of communication to a resource access network node using near-field communication; and using the line of communication, transmitting the first metadata to the access approval system.

20. The one or more non-transitory, computer-readable media of claim 12, wherein transmitting the first metadata to the access approval system comprises:

establishing a line of communication to a resource access network node using a mobile application on a user device associated with the user account; and using the line of communication, transmitting the first metadata to the access approval system.

* * * * *